Patented July 3, 1934

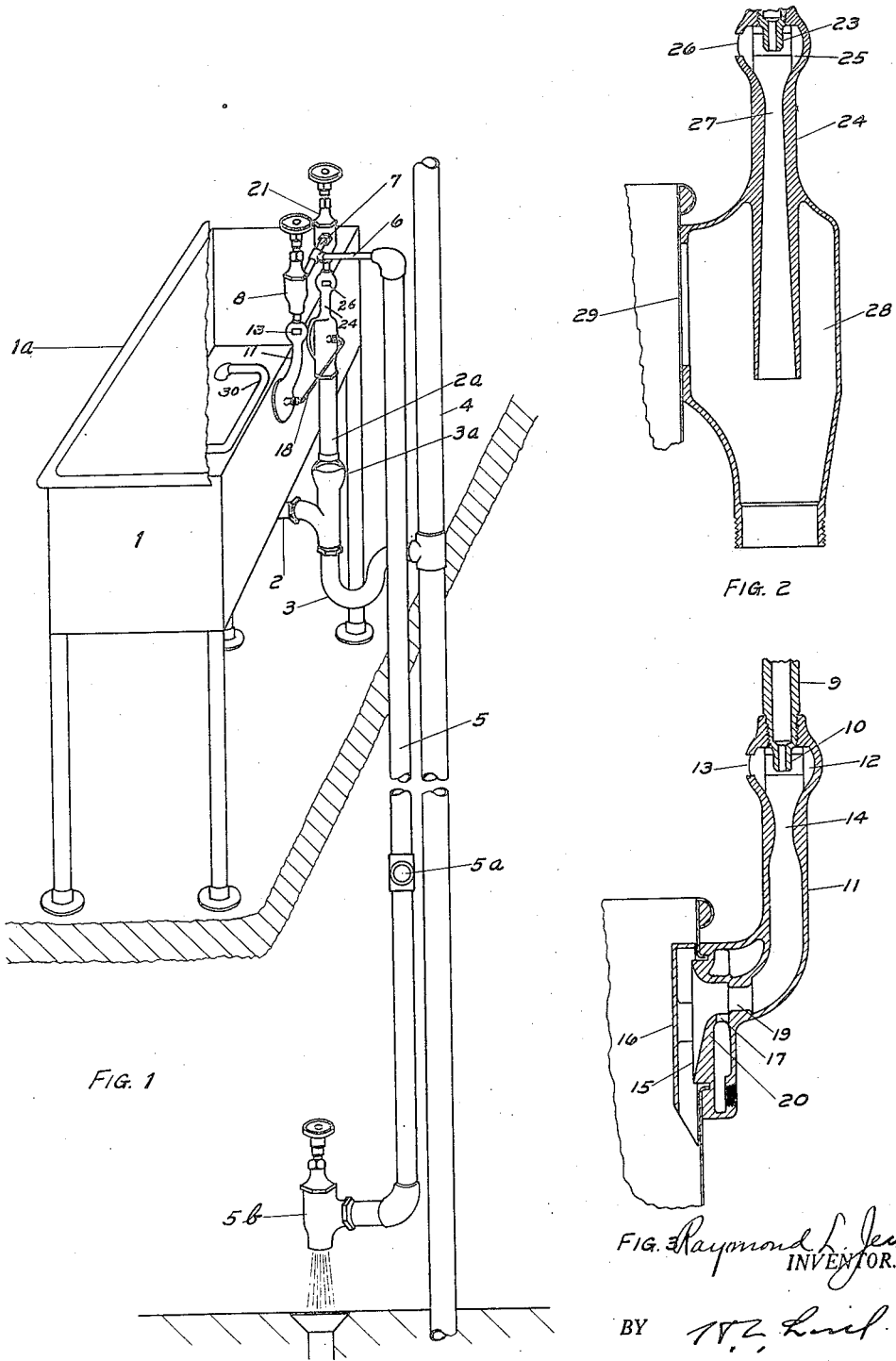

1,965,379

UNITED STATES PATENT OFFICE 1,965,379

STERILIZER APPARATUS

Raymond L. Jewell, Millcreek Township, Erie County, Pa., assignor to American Sterilizer Company, Erie, Pa., a corporation of Pennsylvania Application May 3, 1929, Serial No. 360,236

2 Claims. (Cl. 137—21)

It is desirable to fill sterilizing apparatuses direct from the water supply pipes. Where these pipes extend over different levels, as from floor to floor of an ordinary hospital it so happens that occasionally such pipes are shut off in which event upon the opening of any lower outlet to the pipes contaminated water is drawn into the pipes from the sterilizers of the upper levels. The present invention is designed to obviate such contamination. It is also desirable to condense the steam in sterilizers. This may be conveniently done in connection with the means for filling the sterilizer. Features and details of the invention will appear from the specification and claims.

A preferred embodiment of the invention is illustrated in the accompanying drawing as follows:—

Fig. 1 shows a sterilizer with its connections.

Fig. 2 a sectional view of the steam condenser.

Fig. 3 a sectional view of the water supply connections leading to the sterilizer.

1 marks the sterilizer receptacle, 1a the cover therefor, 2 the drain pipe leading from the receptacle, 3 the trap for the drain pipe, and 4 the standing pipe for the drain. The drain pipe is vented at 3a.

A water supply pipe 5 leads from any connection 5a and has the upright portion extending from level to level. A branch pipe 6 leads from the supply pipe to a cross pipe 7. The cross pipe is connected with a valve 8. The valve 8 is connected through a nipple 9 with a nozzle 10. A supply connection 11 leads from the nipple to the receptacle. It has an enlargement 12 in which are ample vent openings 13. It has a restriction 14, preferably in axial alinement with the nozzle so as to permit of a free flow of the jet of water from the nozzle through it. The connection from the nozzle through an opening 15 in the receptacle leads through an opening 15 in the receptacle wall and a baffle 16 deflects the incoming water along the wall. With this structure water may be supplied to the sterilizing chamber and if, by any chance the supply pipe 5a is cut off and any lower valve, as 5b is opened, draining the pipe 5 there is no possibility of back-drawing water from the receptacle to the pipe by reason of the vent 13. The nozzle 10 is made comparatively small. This permits of making the restriction 14 quite small. This reduces the discharge of vapors from the sterilizer and also gives a more certain assurance against the creation of a vacuum through the supply pipe which may be effective as a connection through to the sterilizer.

It is desirable to prevent any drip that may come from valve leakage reaching the sterilizer receptacle. For this reason I provide the drip slots 17 in the lower wall of the connection. The drip opening is connected by a pipe 18 with the drain pipe extension 2a. The receptacle has a restriction at 19 which deflects and directs the flow over the opening 17 preventing the water moving at the usual velocity of supply water from reaching the drip opening. The fitting inside of the drip opening is flared at 20, thus preventing any back pressure which would tend to deflect the water into the drip opening. On the other hand, if there is a drip from the valve this trickles down the wall of the connection and upon reaching the opening passes into the drip opening and out through the drain.

It is also often desirable to withdraw the steam from the receptacle and to condense the same so that it may be readily discharged to the drain. A valve 21 is connected with the cross pipe 7 and this leads through a nipple 22 to a nozzle 23. The nozzle 23 discharges into a fitting 24, the fitting 24 having an enlargement 25 supplied with vents 26, the restriction 27, and a condensing chamber 28. The chamber 28 is connected through an opening 29 to the upper part of the receptacle. In order to withdraw the steam the water is passed through the chamber 28 and this acting on the steam withdraws it and condenses it from the receptacle and discharges the condensed water to the drain 2a. The vents in this fitting and the restrictions have the same functional purpose as similar vents and restrictions in the fitting 11.

While I have shown a typical instrument sterilizer I wish to be understood as including in the term "sterilizer" any device in which there is a receptacle in which equipment is cleansed, or placed, and which results in the contamination of the liquid in the receptacle. Usually the apparatus is one that is heated and I have shown the heating coil 30 in the receptacle.

What I claim as new is:—

1. In a sterilizer apparatus, the combination of a sterilizer receptacle; a water supply pipe; a valve-controlled connection between the supply pipe and the receptacle having a vent above the water level of the receptacle; and a Venturi-shaped restriction below the vent and in line with the discharge of the water supply pipe, said connection having a drip opening between the valve and the receptacle.

2. In a sterilizer apparatus, the combination of a sterilizer receptacle; a water supply pipe; a valve-controlled connection between the supply pipe and the receptacle having a vent above the water level of the receptacle; and a Venturi-shaped restriction below the vent and in line with the discharge of the water supply pipe, said connection having a drip opening and a restriction forming a jet opening directed above and across the drip opening toward the discharge of the connection.

RAYMOND L. JEWELL.